United States Patent [19]
Stein et al.

[11] Patent Number: 6,104,427
[45] Date of Patent: Aug. 15, 2000

[54] METHOD AND APPARATUS FOR CAPTURING OPTICALLY CAPTURABLE INFORMATION ON ARTICLES WITH POTENTIALLY EXTENSIVE SURFACES

[75] Inventors: Norbert Stein, Wiesbaden; Burghard Hoffmann, Taunusstein; Richard Moreth, Darmstadt, all of Germany

[73] Assignee: Vitroinic Dr.-Ing Stein Bildverarbeitungssystem GmbH, Germany

[21] Appl. No.: 08/937,641

[22] Filed: Sep. 25, 1997

[30] Foreign Application Priority Data

Sep. 27, 1996 [DE] Germany .......................... 196 39 854

[51] Int. Cl.⁷ ..................................................... H04N 7/18
[52] U.S. Cl. .................................. 348/61; 348/88; 348/91
[58] Field of Search ................................ 348/88, 91, 153, 348/154, 159, 61; H04N 7/18

[56] References Cited

U.S. PATENT DOCUMENTS

| 5,132,791 | 7/1992 | Wertz | 348/91 |
| 5,353,358 | 10/1994 | Baird | 348/91 |
| 5,526,050 | 6/1996 | King | 348/91 |
| 5,745,167 | 4/1998 | Kageyu | 348/153 |

*Primary Examiner*—Howard Britton
*Attorney, Agent, or Firm*—Killworth, Gottman, Hagan & Schaeff, LLP

[57] ABSTRACT

A plurality of separate conveyings over each of which a single line camera is mounted and connected to a sensor processor, which itself is connected to a fast data network with a plurality of processing terminals. Because of the high resolution (up to 7000 picture elements per line) and a line scanning frequency of the order of up to 6000 hertz very large amounts of data are received, so in the preferred embodiment a high capacity data network is used, for example a 100 Mbit ethernet with a switching hub.

29 Claims, 5 Drawing Sheets

METHOD AND APPARATUS FOR CAPTURING OPTICALLY CAPTURABLE INFORMATION ON ARTICLES WITH POTENTIALLY EXTENSIVE SURFACES

FIELD OF THE INVENTION

The present invention concerns a method and apparatus for capturing optically capturable information on articles with potentially extensive surfaces. In the process, an article with a potentially extensive surface is brought into the field of view of a video camera and the recognisable information in the field of view of the video camera is inputted into a computer system for identification and/or allocation of the article. The apparatus comprises a video camera and input means for information captured in the field of view of the video camera. The optically capturable information on the surface of an article frequently only occupies a small part of that surface, particularly when the article has a very extensive surface. In the present invention, the surface of an article from which information is to be read does not actually have to have an extensive (generally flat) surface, and in some cases this surface can be relatively small, however the method and apparatus are so designed that information is accurately captured largely independently of the size of the surface even when the article in question has a very extensive surface while the information may occupy only a small part of that surface. The term "surface" in the present description generally means the surface of an article which is directly facing the camera, the distance of the surface from the camera being variable within the depth of field of the camera's optics, and which surface may also be uneven, for example undulating to a greater or lesser extent.

BACKGROUND OF THE INVENTION

A typical application for corresponding methods and apparatus is a mail routing station: In a mail routing station, packages of widely different sizes are delivered on conveyor belts which are generally designed to take packages up to a set maximum size, although all of the packages do not necessarily have to be of the maximum size. The present invention should not, however, be limited to mail routing stations, but can also be used in production methods comprising sorting and routing stations or the like. For better comprehension, however, the following description primarily refers to the example of a mail routing station. Prior art methods and apparatus of the type described above are known but only with quite definite limitations. Conventional video cameras are not capable of completely capturing articles with extensive surfaces with sufficient resolution to sufficiently clearly recognise, i.e., with the required resolution, information which appears on only a very small region of the article with an extensive surface.

When video cameras have been used in such stations, they have been restricted to applications for which it was certain that the surface area of an article carrying the necessary information for identification and allocation thereof always passed through a set field of view which could be relatively small compared with the whole of the surface of the article facing the video camera. In practice, the method could thus only be used for standard packages which always had an address label or the like in the same region of the package, and wherein the packages always had to be arranged in the same orientation and position on a conveyor belt or the like. Such a method is still applicable for mail order operations, for example, which use standard size packages with standardized packaging, so address labels always have the same size and positioning on a package. Further, packages of a single size can be placed on one conveyor belt so the camera is always the same distance away from the surface of the package. These conventional methods are, however, not suitable for mail or other commercial courier services which receive packages from the public or at least from different clients and carry them to a different address. Such packages are standardized only in that they cannot exceed a set maximum size. A widely accepted standard, for example, is a maximum height and width of 900 mm; in some circumstances the length can exceed this value. In general, such packages are parallelepipedal in shape and have a flat surface bearing the address, handling information or information regarding the contents (breakage risk, right way up when transporting, or in storage), and the type of carriage (for example express mail). In addition, information regarding the sender can also be present on the surface of the package. Neither the size nor the arrangement of this information on the surface of the package is clearly fixed. Further, some of this information or additional information can be presented on the surface of the package in the form of a barcode.

Prior art methods and apparatus for such packages involved a person standing by a conveyor belt who looked at the package and inputted the information on the package directly into a terminal or the like located near the conveyor belt. A barcode reader could also be used.

SUMMARY OF THE INVENTION

In the light of this prior art, the present invention aims to provide a method and an apparatus of the above defined type which can remotely capture and preferably automatically capture information even in situations where the information to be transferred to the computer system is arranged in any parts of the surface area of potentially extensive surfaces.

In the method defined above, the invention provides that a high resolution line camera is used as the video camera, the line length of which completely covers the maximum dimension of an article in this direction at the object distance, that the article is moved at a substantially continuous speed through the image window or the image plane of the line camera substantially transversely to the longitudinal extent of the image line, and that the picture scanning frequency and the forward speed of the articles are so coordinated that the resolution, i.e., the interval between successive image lines, is of at least comparable magnitude to the resolution within an image line. Depending on requirements, the resolution between the lines can differ from the resolution within the lines by a factor of 1 to 10, however in a preferred implementation of the inventive process, the resolution in both directions is about the same. It should in particular be noted that the orientation of the information on the surface of the article is not fixed, so there has to be a certain minimum resolution in each direction. Because a high resolution line camera is used, information on a surface of only 100×100 $mm^2$, for example an address in a normal or in a smaller font, which is on very extensive articles with a surface of 900×1000 $mm^2$, for example, can be read and inputted.

The terms "read" and "input" encompass both reading and inputting by a person and automatic machine reading which may be monitored and confirmed by a person.

Within the context of the present description, the term "image line" means a line or row of points or small areas on the surface of the article which forms an instantaneous field of view for the line camera. In contrast, the term "picture line" means the corresponding row of picture elements or areas in the picture of the article which is displayed on a terminal or other display medium or stored in a memory in the form of digitalized data.

Preferably, a line camera is used which has more than 1000, preferably more than 3000 and more preferably about 5000 to 7000 picture elements along the line. As can readily be calculated, 5000 picture elements along an image line of 1000 mm, for example, gives a resolution of 0.2 mm. This is more than sufficient for normal script and the skilled person will recognise that such a method with a resolution of, for example, 2000 picture elements over 1 meter could also be carried out with acceptable accuracy for sufficiently large scripts. A maximum line resolution of 7000 elements is preferred, however.

The object distance should preferably be more than twice, in particular more than three times, the maximum width of the articles to be captured. This object distance is measured along the optical beam axis of the system, which is not necessarily straight. This beam path can be diverted via one or more mirrors or even via fibre optic light guides or the like, if for example this seems necessary or appropriate to limit the height of the overall system. The relatively large object distance thus ensures sufficient depth of field of the camera optics which in all cases covers the region within which the distance of the surface of the object from the camera optics can vary during its passage through the image plane. In this respect it should also be considered that because of the potentially relatively extensive surface and maximum length of an image line of 1 m, for example, the central image points of this line are much nearer to the camera optics than the image points at the ends of the line (if the camera is symmetrically arranged with respect to the centre of the image). These relative differences are reduced because of the relatively large object distance of the camera. In addition, it should be noted that the individual articles can have very different heights. For a mail routing station which is taken as an example, the difference in height between different packages can, for example, be up to 800 mm. In order to be able to capture the shortest and tallest articles with sufficient sharpness, automatic re-focusing is provided, although in this case too the large object distance of the line camera means that focusing is possible over the variable distances brought about by the height of the articles.

In a preferred variation of the method of the invention, the line sensor in the line camera is shifted relative to the camera optics for the purposes of automatic focusing. In practice, the camera optics or an imaging lens are held in position and the distance of the line sensor in the line camera from the lens or optics is varied depending on the distance to the surface of the object. A shift of the order of 1–2 mm is sufficient to even out the image focus for height differences of 800 mm with an object distance of at least 3 m.

Suitable illumination is also important for precise image capture within the context of the present invention. In this respect it is of advantage to use a line camera which captures only a very narrow strip of the surface of an article, wherein the overall image of the surface of an article is made up of a plurality of successive parallel strips formed from successively recorded picture lines as the article is moved through the image plane, while the camera successively records the individual lines at a pre-set frequency and buffer stores the image data. In contrast to prior art methods, then, the whole surface of the article or the whole of the portion thereof which contains the information does not have to be evenly illuminated, but it is sufficient if the surface of the article is homogeneously illuminated along the narrow line formed by the intersection of the surface of the article and the image plane. The image plane is defined by the optical axis of the camera and the line direction.

In accordance with the invention, the light from the illuminating means is focused so that the plane of maximum intensity cuts the image plane near the surface of the conveyor apparatus or in the region of the surface of an article with a maximum distance from the camera, i.e., the surfaces of the smallest articles which are furthest from the camera are illuminated with maximum intensity in the image plane and thus along the image line. For higher surfaces which are nearer the camera, the illumination intensity in the image plane is correspondingly reduced, but this is compensated for by the smaller distance from the camera to the surface of the article, so the image line has essentially the same apparent brightness as for a more distant but more intensively illuminated image line.

A further aspect which affects illumination is possibly when the scanning frequency is changed, which advantageously increases with the height of the surface of the article, so that in the conveying direction, namely at right angles to the image line or picture line, the resolution is the same as within the line. This is only the case when the resolution changes in the line direction for an surface of an article which is closer to the camera, i.e., when for a more distant surface the whole line length of the line sensor and thus the fall line resolution cannot be used, so that closer surfaces can be captured with a higher resolution. This is always the case when the camera is not provided with zoom optics and thus operates with a constant focal length. This increase in the scanning frequency reduces the apparent brightness of the images of closer surfaces, but does not fully compensate for the increase in brightness through the corresponding reduction in the distance from the light source if the illumination intensity were not varied in the intended manner. The required intensity gradient of the illumination, seen in a direction at right angles to the plane of maximum intensity, is somewhat flattened.

The maximum illumination intensity plane advantageously has an angle of inclination of at least 0°, preferably about 100 to 30° and at most about 50° relative to the image plane, where the image plane is preferably inclined in the same direction as the illuminating plane with respect to a perpendicular to the conveyor surface. The image plane can, for example, be inclined at 20° to a perpendicular to the conveyor plane, and the intersection between the image plane and the conveyor plane is generally perpendicular to the conveying direction. Independently of the inclination, the image plane can also be rotated through a small angle about a perpendicular to the conveyor plane, so that said intersection is no longer perpendicular to the transport direction.

Simultaneous inclination of the image plane and the illumination plane primarily serves to reduce reflections captured by the camera, which can arise with reflective surfaces, for example foils and particularly slightly undulating foils, on the surface of the article. With the preferred inclined arrangement, such reflections are not captured by the camera or are captured but are less of an inconvenience.

In a preferred implementation of the process, a plurality of line cameras over or on a plurality of conveying means capture the surfaces of articles transported thereon, where the line cameras are connected via a storage means and a network to a master computer and to input terminals, on which the imaged surfaces of the articles may be displayed and which can be used to input the information therefrom.

The method of the invention is particularly intended for use in a mail routing station.

In the apparatus defined above, the invention provides that a high resolution line camera is provided as the video camera, in which the camera optics are so designed or arranged that the maximum width of an article, seen in the line direction, is completely captured, and that a conveying means is provided, which transports the article transversely to the line direction through the image plane of the line camera at a substantially uniform speed.

The transport means is advantageously a conveyor belt which transports the articles in a substantially shake-free fashion at least in the region of the line camera.

The apparatus is preferably so arranged that the picture scanning frequency of the line camera and/or the transport speed of the conveying means are mutually coordinatedly controllable. The line scanning frequency of the line camera, in combination with the transport speed of the conveying means, produces the interval between successive image lines and thereby also the interval and resolution of the corresponding picture lines to be displayed.

As already mentioned, for a capture width of 900 mm, the line camera should be more than 2 m from the surface of the articles to be imaged. The camera is advantageously positioned about 4 m over the surface of a conveyor belt for the articles at a corresponding optical distance.

The line camera is also arranged so that its image plane as defined above is somewhat inclined in the direction of the plane of the belt.

Advantageously, the corresponding illuminating means has a light source the light from which is concentrated by means of a focusing means so that a plane of maximum luminous intensity which is essentially constant for a constant distance is inclined both to the plane of the conveying means and to the image plane of the line camera. The light source can be formed by a series, two in the simplest case, of point sources in a line (parallel to the image line), each having its own focusing means, so that the overlapping luminous intensities of the series of point sources come relatively close to the luminous intensity distribution of a homogeneous linear light source. In this way, the light is focused towards one side by the focusing means, producing a plane of maximum luminous intensity, i.e., a plane which is defined on the one hand by the linear light source or series of point sources and on the other hand by the direction in which the maximum luminous intensity is produced. The illuminating means or focusing means with the light source are then advantageously so arranged, that the plane of maximum luminous intensity cuts the image plane defined above at about the surface of the transport means or somewhat above it, namely at the height of the surface of an article of minimal height being transported by the transport means.

In practice this means that the article is illuminated by the illuminating means so that across the article, a line of maximum luminous intensity is produced which gradually decreases in intensity on both sides, i.e., to the foremost and rearmost ends of the article. In this way, for the shortest articles, with which the surface whose image is to be formed is at the maximum distance from the line camera, this line of maximum illumination intensity coincides exactly with the image line captured by the line camera. Because of the relative inclination of the plane of maximum luminous intensity to the image plane, for taller articles the image line is distanced from the line of maximum illumination intensity and parallel thereto.

In this way, the inclination of the plane of maximum luminous intensity and the intensity distribution is advantageously so arranged that the lower illuminating power of the image lines for taller articles is compensated by the shorter distance from the camera, so that articles of different heights have about the same apparent brightness of the image line. The angle between the image plane and the plane of maximum luminous intensity is advantageously at least 10° and at most 50°, and this angle of inclination, like the inclination of the image plane in the same direction, contributes to preventing inconvenient reflections from reflective regions of the surfaces, for example cover foils or the like, from being directed into the line camera.

In the preferred embodiment, the apparatus of the invention has a plurality of separate conveying means over each of which a single line camera is mounted and connected to a sensor processor, which itself is connected to a fast data network with a plurality of processing terminals. Because of the high resolution (up to 7000 picture elements per line) and a line scanning frequency of the order of up to 6000 hertz very large amounts of data are received, so in the preferred embodiment a high capacity data network is used, for example a 100 Mbit ethernet with a switching hub.

Using such an apparatus, it is possible when using a plurality of line cameras and a plurality of terminals to connect each sensor processor of the line cameras to any desired terminal. The number of input terminals is preferably independent of the number of line cameras. This feature arises because, for example, capture and manual inputting of the data by a user takes longer than capture of the surface of an article using a line camera, so the images from the line cameras are buffer stored and called up by a terminal for processing. The slower image processing rate at the terminals compared with image capture using line cameras is compensated for by using a larger number of terminals. The individual captured images are buffer stored in the sequence in which they are captured and are individually sent to the terminals in exactly that sequence, namely in the sequence in which the individual terminals notify that they are ready to process a new image.

On the other hand, automatic capture and identification of image information may be faster than capturing the surfaces of the articles, so in such a case the number of processing terminals could be smaller than that of the cameras and their sensor processors. Depending on the degree of automation and requirements for correction or monitoring by personnel, the ratio of the number of terminals to that of the cameras can vary accordingly. When the information is unequivocally automatically identifiable, evaluation can be effected directly in the sensor processor and the (coding) terminals can be omitted.

The terminals are provided with means for selectively enlarging the buffer stored images. In this respect, the captured images are preferably compressed by the camera electronics or by the local sensor processor, so that large homogeneous surfaces of the image carrying no information only take up a small amount of storage space, while areas which are rich in contrast, which contain the desired information to be inputted, are stored using larger amounts of data.

Besides the selective enlargement means, each terminal advantageously also has means for rotating the image or image section, preferably through 90°, 180° or 270°, and optionally also by stepwise rotation through discrete angular steps.

Further, each terminal has means for manually inputting information which is read from the terminal screen.

In a particularly preferred embodiment of the apparatus of the invention, means for automatically capturing the information and for displaying the automatically captured data are provided. As an example, in addition to a barcode reader, the apparatus can also comprise an optical scanner which, with a suitable program, searches the surface of the article stored as a digital image in the computer for regions of the surface which clearly contain the desired information, which can then be translated into corresponding digital symbols using character recognition software with display of the result at the terminal, for example in a separate window on a screen. A person then only needs to check whether the automatically captured data displayed in the window agrees with the visible information of the surface of the package which is also displayed on the screen and confirm this or, if necessary, use the input means to make any necessary corrections. In this way, for example, it can be confirmed that sender and receiver have not been confused on automatic reading or reading errors in the character recognition reader can be corrected. In the event of unequivocal identification, visualisation can be omitted.

BRIEF DESCRIPTION OF THE DRAWINGS

Further advantages, features and applications of the present invention will become clear from the following description of a preferred embodiment made with reference to the accompanying figures, in which.

DETAILED DESCRIPTION OF THE INVENTION

Figure 1:
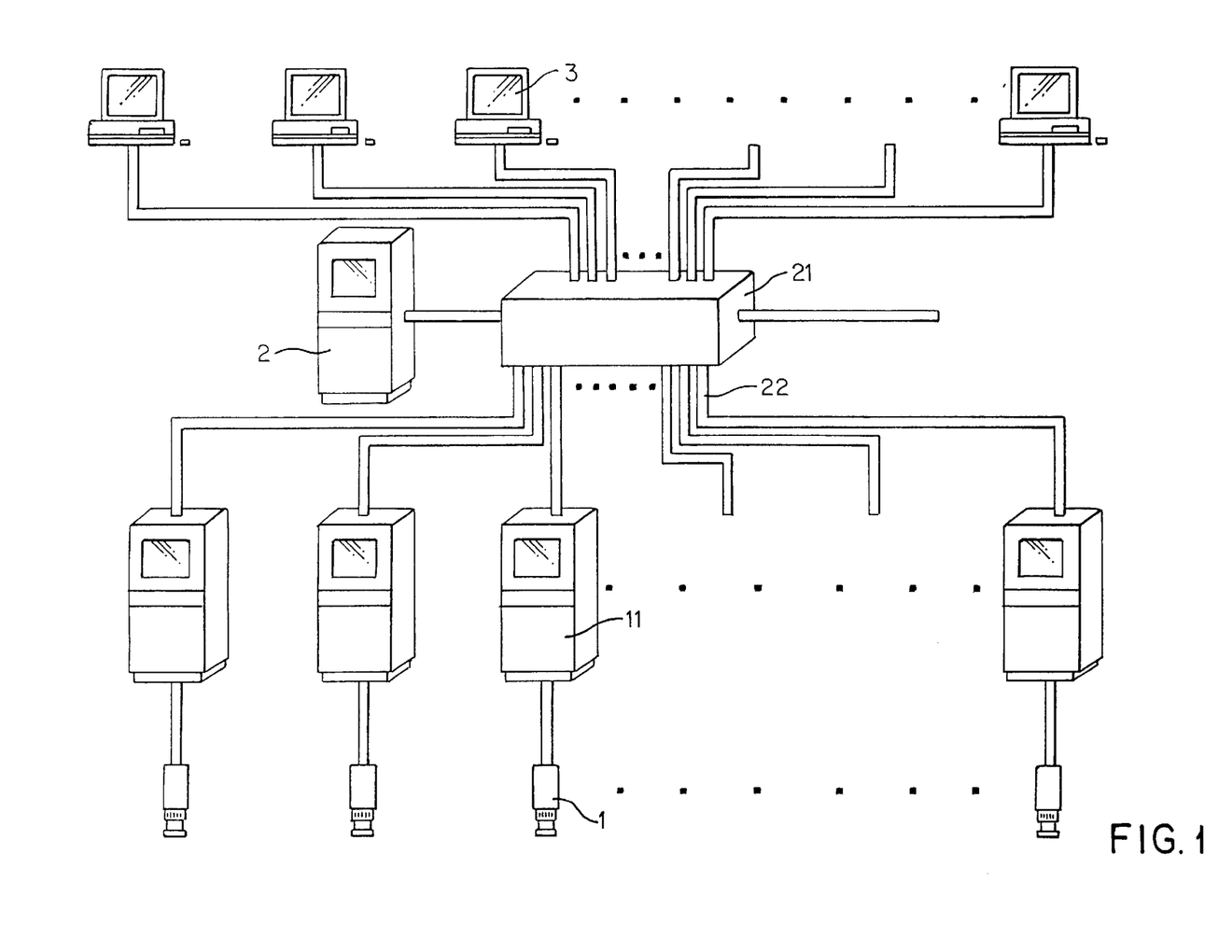
FIG. 1 is a view of a network of line cameras, input terminals and a master computer, as used for example in a mail routing station.

FIG. 1 shows a series of line cameras, only four of which are properly shown. Each line camera comprises a sensor unit, an autofocusing apparatus and a sensor processor 11, also apparatus for controlling the sensors, apparatus for image preparation, image processing and communication with a master computer 2 and with input terminals 3, these tasks being at least partially undertaken by the sensor processor 11. The network is, for example, a fast ethernet with a transfer rate of 100 Mbits per second. An essential part of network 22 is a switching device 21 known as a switching hub which is controlled by master computer 2 and makes it possible for each sensor processor 11 to be connected to each of terminals 3, whereby each terminal 3 has access to image storage or can receive image data from master computer 2 via hub 21 and network 22. Individual surfaces captured by cameras 1 are then sent to a buffer store in the sensor processor as at least partially compressed image data and are transferred via master computer 2 to a terminal in the same sequence when that terminal 3 indicates that it is ready to process a new image. Sensor processor 11 informs master computer 2 of every complete capture of an image of a surface 9, which master computer then transmits the images to the terminals in the appropriate sequence.

Thus the screen of terminal 3 displays the complete surface of a package and the terminal user then selects the region of the package surface which contains the desired information using a mouse or another control means.

Figure 2:
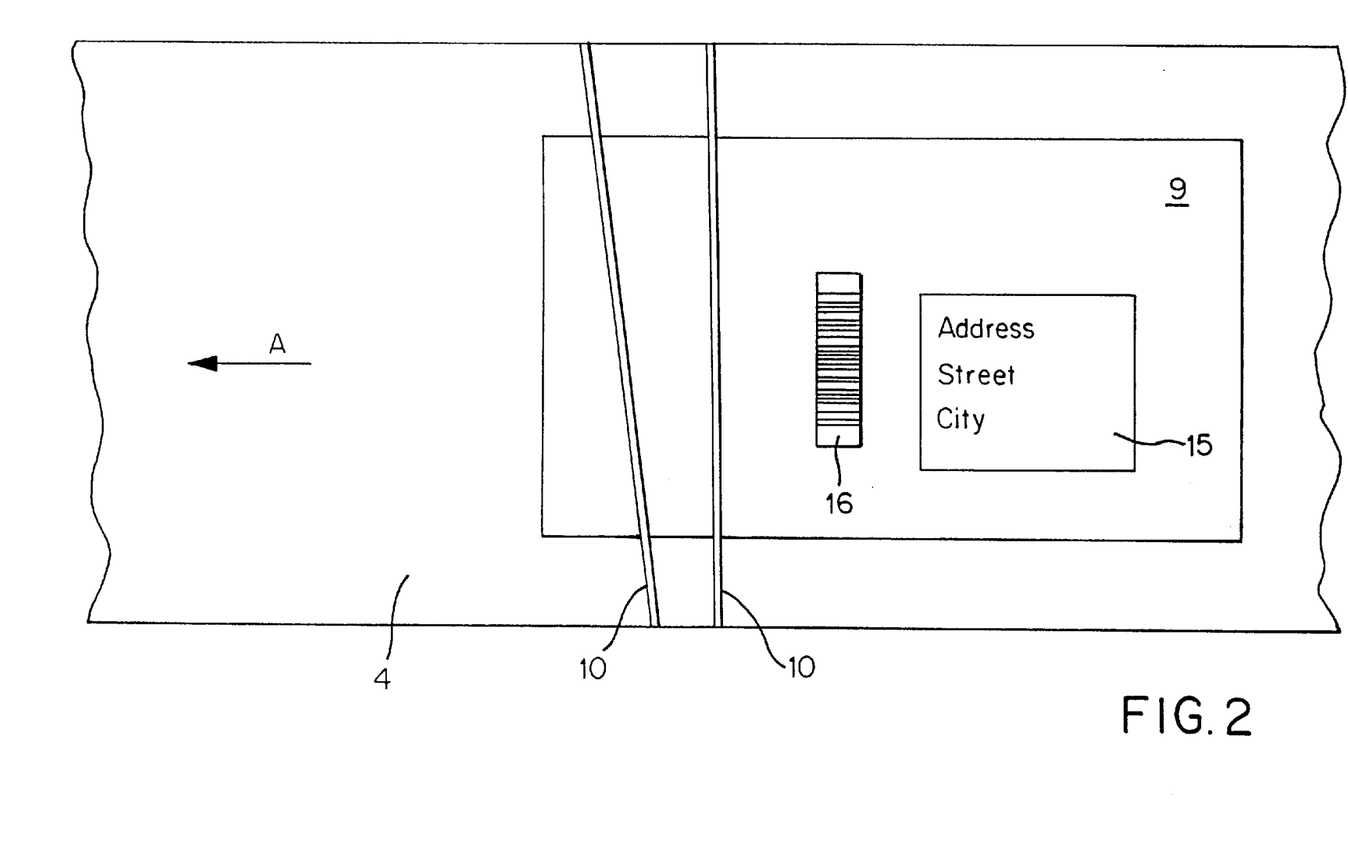
FIG. 2 is a top view of an surface of a package with information on a portion of this surface.

FIG. 2 shows a corresponding surface 9 of a package with an address label 15 and a barcode 16. The barcode can be automatically searched for and read using a barcode reading program. If necessary, address label 15 can be enlarged on the terminal screen and the user can input address information into the system using a keyboard. Conveyor belt 4 is also identified as the belt carrying the package and if necessary, the information from barcode 16 can be reproduced in plain script. FIG. 2 also shows the intersections of two different image planes 10 and 10' with the package surface 9. It can be seen that the image plane, defined by the line direction and the optical axis of the camera, cuts the conveyor plane exactly perpendicular to the conveying direction, and can be turned through an angle about the optical axis or a perpendicular to the conveyor plane. It is also possible to capture the surfaces by using two cameras simultaneously, one with an image plane 10 which cuts the conveyor belt perpendicular to the conveying direction and the other with an image plane 10' which is rotated about the optical axis relative to the plane 10.

The two cameras and their optical axes are also inclined with respect to a perpendicular to the surface 9 or the surface of the conveyor belt 4. In this way, any light reflections are prevented from entering the camera.

Figure 3:
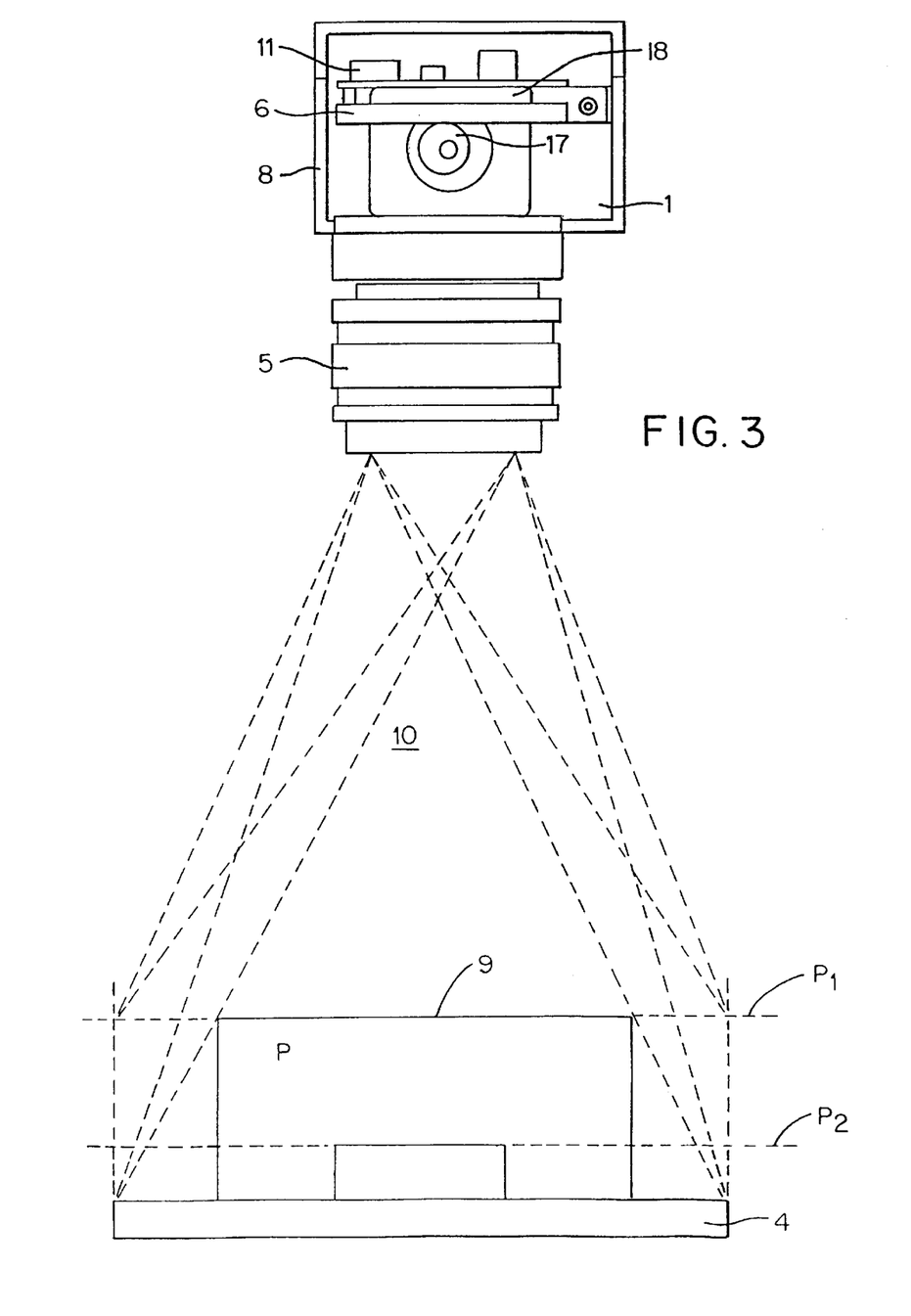
FIG. 3 is a section through a schematic view of a video camera in the image plane over a conveyor belt.

FIG. 3 shows the paths of beams for optical imaging of packages of differing heights. The sectional plane (plane of the paper) of FIG. 3 coincides with the image plane 10 of video camera 1. It can be seen that line sensor 6, which is to accurately capture the whole width of a tall package P1 with its entire line length, must be located at a somewhat different distance from lens 5 when an equally broad surface area of a shorter package P2 is to be clearly captured. Because of the very large distance between camera lens 5 and package surface 9 compared to the relatively small distance between line sensor 6 and camera lens 5, a height change of line sensor 6 of the order of 1–2 mm is sufficient to clearly image all package surfaces 9 with surface heights between the tallest package P1 and the shortest package P2. For a given position of line sensor 6, the depth of field is sufficiently large to be able to capture information from surfaces which vary in their distance from the camera by a few centimeters during passage through the image plane. When the camera optics have no zoom optics, then for short packages, with a surface which is a larger optical distance from camera sensor 6, the full line length or breadth is not used for imaging. Resolution is somewhat reduced thereby, and the line frequency is correspondingly reduced to achieve the same resolution in the forward direction.

The height adjustment apparatus for optical focusing advantageously has a bearing plate or the like for line sensor 6, which is rotatably mounted on an axis which is parallel to the sensor line and at a distance from the sensor. The plate is turned about this axis by means of a cam drive to change the distance of the sensor from the camera optics. The bearing plate or the like is biased towards the cam so the position of the line sensor is clearly defined in each cam position. Such an apparatus is very robust, practically wear-free and when using for example a step motor as the cam drive it can position itself accurately and can react quickly. The resulting slight turning of the line sensor about its longitudinal axis does not influence its sensitivity to light in the direction of the incoming light.

Figure 4:
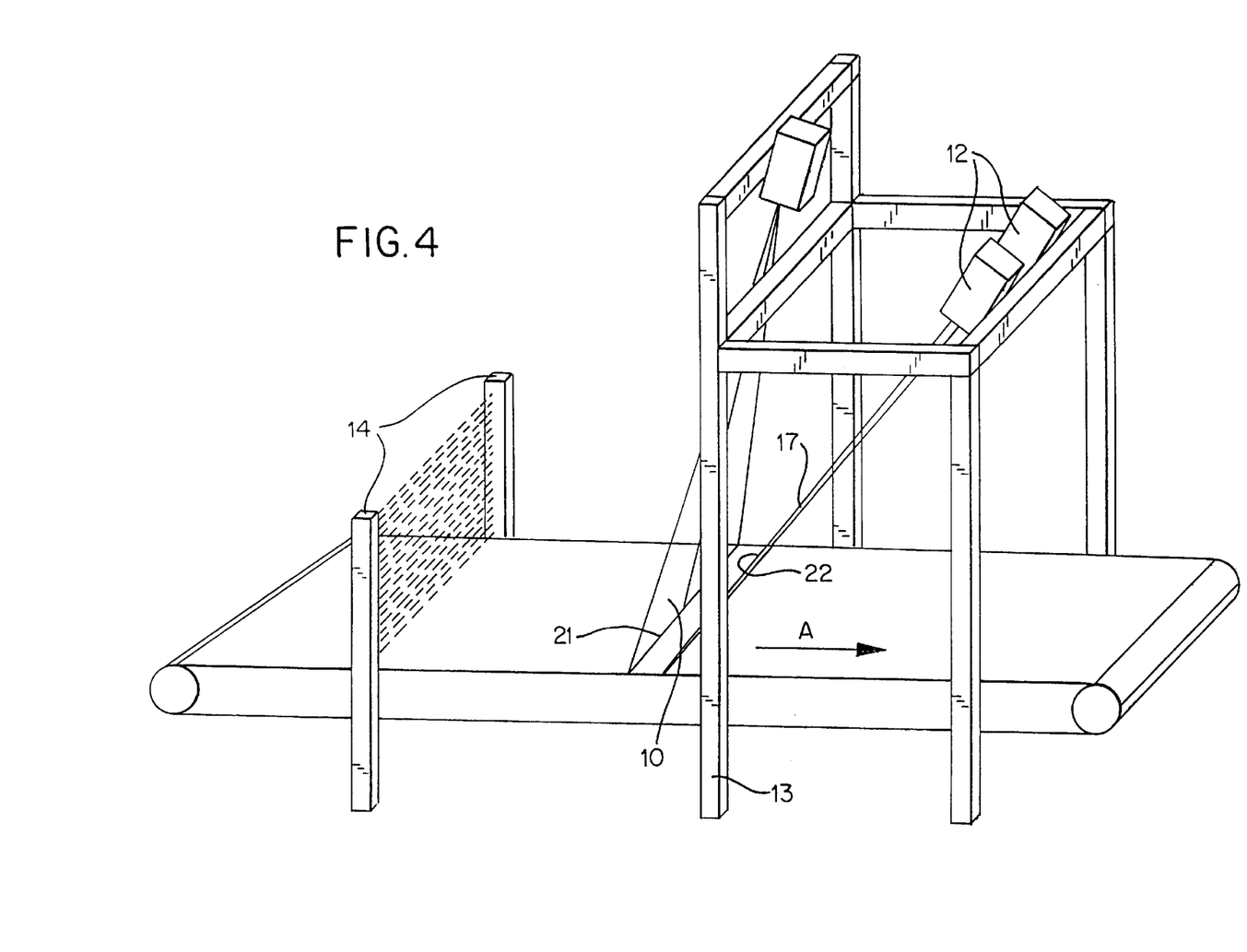
FIG. 4 is a perspective view of a capture apparatus.

FIG. 4 schematically shows a portion of a mail routing station comprising a conveyor belt 4, a height measuring means 14 and a frame 13 on which camera 1 and illuminating means 12 are mounted. Packages are placed on conveyor belt 4 and transported in the direction of arrow A. They pass through a height measuring device 14, formed for example from a plurality of parallel light barriers. The measured height causes the autofocusing system of line camera 1 to react and adjusts the distance of line sensor 6 so that the plane of the surface 9 of package P is sharply imaged.

Clearly, instead of the light barrier height measuring means, for example optical triangulation, ultrasound, radar or infrared measurement can be used in order to measure the distance between the surface of package 9 and camera optics 5.

The illuminating means 12 consists of an essentially linear light source or a linearly arranged series of point sources with a focusing means which directs the light from the light source onto the surface of packages P, which are captured by the line camera. In this way, illuminating means 12 can have a slightly smaller distance from the surface of conveyor belt 4 and the surface of article P than camera 1. In practice, an illuminating means with the desired intensity distribution can be produced using two point sources arranged a suitable distance apart, the focusing apparatus of which produces a bell-shaped intensity distribution. Along a line parallel to the line connecting the two sources, their intensities add to give a constant value for the same distance from this line. The plane 17 defined by each source axis and their line of connection is a plane of maximum illumination intensity. The two sources shown in FIG. 4 can be separately adjusted to adjust the optimal illumination. In FIG. 4, plane 17 of maximum illumination intensity intersects the conveyor belt along a line 22 which, viewed in the transport direction of the belt, lies behind the intersection 21 of image plane 10 with conveyor belt 4. The exact and desirable arrangement of these planes 10, 17 has already been mentioned and will now be explained with reference to FIGS. 5 and 6.

FIG. 5 again shows the illumination and imaging situation. Illuminating means 12 can, for example, consist of a series of point sources whose light is focused and directed downwardly onto conveyor belt 4. Where the plane 17 defined above cuts the surface-9 of an article, the illumination intensity is strongest on this surface. Along a line parallel to the series of point sources, the illumination intensity is constant. Even two parallel point sources which have a bell-shaped intensity distribution about a central axis and which are arranged at a distance from each other which produce this intensity distribution can closely approximate the above conditions for illumination.

Figure 5:
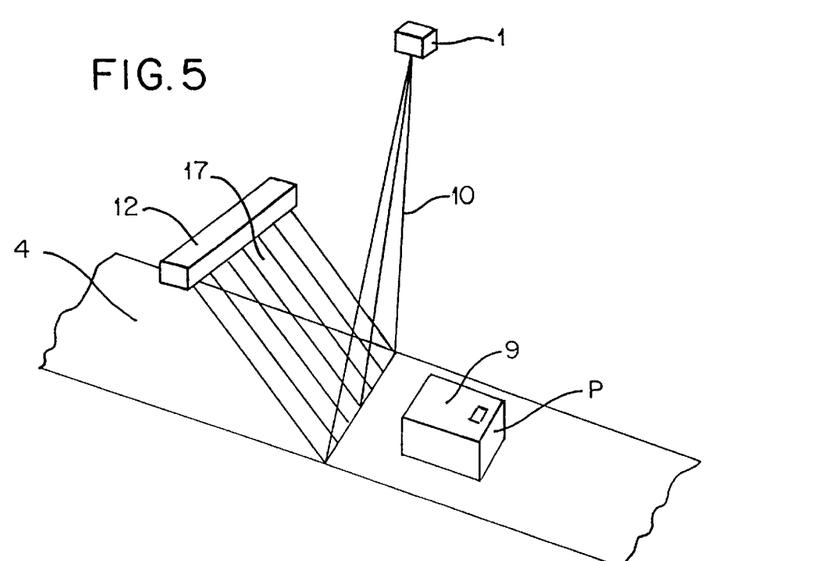
FIG. 5 is a perspective representation of the relative arrangement of camera and illumination system.
Figure 6:
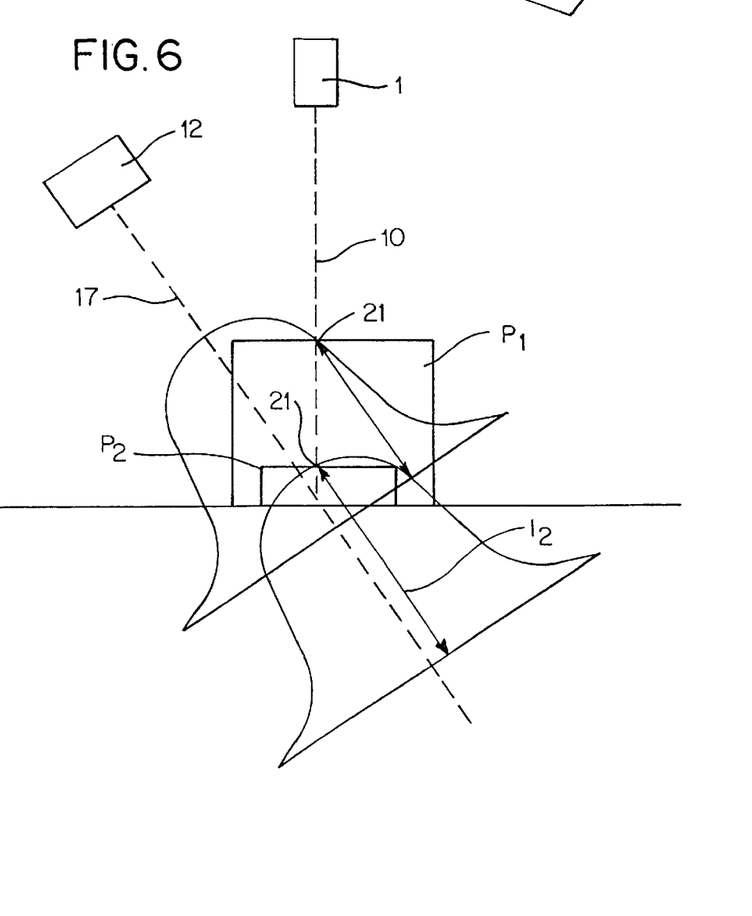
FIG. 6 is a diagram explaining the different illumination intensities at different heights of the surfaces.

Plane 17 is so arranged that the intersection of plane 17 with the plane of conveyor belt 4 is as close as possible to the image line captured by camera 1, i.e., the intersection coincides with the intersection between image plane 10 and plane 17 or between image plane 10 and the surface of the conveyor belt. Either side of plane 17 of maximum illumination intensity, surfaces are illuminated with a somewhat lower intensity. Thus when a package P is transported-via conveyor belt 4 through image plane 10 (and also through plane 17 of maximum illumination intensity), the intersection 22 between surface 9 of the package and plane 17 does not coincide with the intersection 21 between surface 9 and image plane 10.

Along image line 21 of package surface 9, formed by the intersection of plane 10 and plane 9, the surface 9 of the package is less strongly illuminated than along the parallel intersection 22 between package surface 9 and plane 17 of maximum illumination intensity. The taller the package P, the large the distance between the line of maximum illumination intensity and image line 21 and correspondingly the intensity of the illumination of image line 21 decreases with increasing package height. However, because the distance of the package surface from camera 1 decreases, the light sensitive sensor 6 of the line camera takes correspondingly more light from the image line than from an image line at a greater distance (illuminated with the same intensity). The reduction in intensity of the illumination of taller packages is thus at least partially compensated for by the shorter distance from the camera. Thus finally it is only a question of inclining plane 17 and selected focusing and intensity distribution relative to plane 17 when the brightness changes in the image line for different package heights are to be so varied that the apparent brightness of the image line for the line camera remains unchanged, so that for identical surfaces, the light sensors of the camera always receive essentially the same amount of quanta per picture element and time unit, when the distance of the surface from the camera changes within the intended range. In this way different aperture opening times can be considered for the camera for different resolutions in the transport direction.

FIG. 6 again schematically shows the effect of the illumination of the invention, the illumination intensity distributions being so shown that they respectively pass through the image line at the package surface. It should particularly be noted that in itself, the illumination intensity of the package surface decreases with increasing distance of the package surface from the illuminating means 12, which is over-compensated at least for the region of image line 21 in the above case since with increasing distance of the package surface, as in the case of package surface 2, the image line gets closer to the maximum intensity of the illumination. The image line is thus more strongly illuminated with increasing distance from the illuminating means 12 and at the same time with increasing distance from camera 1, as can be seen from the lines of intensity $I_1$ and $I_2$ shown in FIG. 6 illuminating the surfaces of different packages P1 and P2.

It should be understood that this method of illumination and the corresponding illuminating means are independent of the other features of the present invention and can be used for completely different applications which do not involve the capture of information from potentially extensive surfaces, for example for automatic distribution and sorting stations and any type of optical capture apparatus.

What is claimed is:

1. A method for capturing optically capturable information on articles with potentially extensive surfaces, in which, for the purposes of identification and/or allocation, each of said articles are brought into the field of view of one of a plurality of video cameras and the information captured from the fields of view of said plurality of video cameras are inputted into a computer system, said method comprising the steps of:

using a plurality of high resolution line cameras as said plurality of video cameras, each of said line cameras having a video picture line length;

positioning each of said plurality of line cameras on or over a corresponding one of a plurality of respective conveyors carrying said articles to optically capture the surfaces of said articles, the video picture line length of each of said line cameras completely covering the maximum dimension of an article in the direction of said video picture line and at an object distance;

connecting camera electronics and a sensor processor to each of said line cameras;

moving said articles at a substantially continuous speed through respective image planes of said line cameras substantially transversely to the longitudinal extent of the video picture line;

coordinating a scanning frequency of the video picture line of said line cameras and the forward speed of the articles so that the resolution within the lines is of comparable magnitude to the resolution between successive lines;

connecting the line cameras to input terminals via their sensor processors and a network including a master computer;

buffer-storing the captured video data of individual articles in the order in which their surfaces have been captured as images;

providing the transfer of compressed (low resolution) data from the master computer to the terminals where the images are displayed on respective screens in the same order in which it was captured; and transferring full resolution data to the terminals only of selected areas of said images for enlarged display on said screens.

2. A method according to claim 1, characterized in that a line camera is used which has more than 1000, preferably more than 3000 and in particular, for example, 5000 or 7000 picture elements.

3. A method according to claim 1, characterized in that the optical distance between the camera and the article is more than twice, preferably more than three or four times, the maximum capture width.

4. A method according to claim 1, characterized in that the light sensitive sensor of the line camera is moved relative to the objective of the video camera in order to adjust the focus.

5. A method according to claim 4, characterized in that the light sensitive sensor of the line camera is rotated about an axis which is parallel to the longitudinal extent of the sensor.

6. A method according to claim 1, characterized in that the stored video data of an article is used to produce at a terminal a section of the surface of the article which contains optically capturable information.

7. A method according to claim 1, characterized in that plain script and/or bar code information on the surface of an article is captured by an automatic reading means and inputted into the computer system.

8. A method according to claim 1, characterized in that the captured video data of individual articles are buffer stored in the order in which their surfaces have been captured and are displayed on request in the same order on the screens of terminals and/or are analyzed in the computer unit.

9. A method according to claim 1, characterized in that it is used in a mail routing station.

10. A method according to claim 1, characterized in that the surface of the article in the image plane defined by the video picture line and the optical axis of the video camera is elevated with increasing distance of the surface of the article from the video camera, so that the apparent brightness of the section of the surface captured by the line camera is essentially the same for different distances from the line camera.

11. A method according to claim 10, characterized in that one or more illumination elements are used which have an approximately bell-shaped brightness distribution in at least one plane, in which the plane at right angles to that plane, which contains the axis of the bell shaped distribution, cuts the image plane close to the maximum object distance from the line camera.

12. A method according to claim 11, characterized in that the plane of symmetry of the intensity distribution is at an angle of at least 20° relative to the image plane.

13. An apparatus for capturing optically capturable information from articles with potentially extensive surfaces, said apparatus comprising:

a plurality of high resolution line cameras having a picture element line length, in which the camera optics are so designed or arranged that the maximum width of an article, seen in the picture element line direction, is completely captured by one of said line cameras;

a plurality of conveyors associated with said line cameras and transporting the articles to be captured transversely to the line direction through the respective image planes at a substantially uniform speed;

camera electronics including a sensor processor connected to each of said line cameras;

buffer means associated with each line camera for storing video data of images captured by said line camera;

compressing means for reducing the amount of video data of said images;

a plurality of terminals, a master computer and a network connecting the line cameras and the respective buffers thereof with each of said terminals;

selection means for selecting an image stored in one of said buffers for being displayed on a screen of a terminal upon request from said terminal, said selection means being adapted for transferring the image data to said terminals in the same order in which the images have been stored in said buffers; and means for transferring full resolution video data of a restricted area of said image upon request from a terminal after transferring the complete image in the compressed state.

14. An apparatus according to claim 13, characterized in that the picture scanning frequency of the line camera and/or the transport speed of the conveying means are mutually coordinatedly controllable.

15. An apparatus according to claim 13, characterized in that the line camera is located beside or above a conveyor belt at an optical distance of more than twice, preferably more than four times, the maximum capture width of the line camera.

16. An apparatus according to claim 13, characterized in that the image planes defined by the line directions of the line cameras and lines connecting the objects to the line cameras is slightly inclined with respect to a perpendicular to planes of the conveyor, preferably in the transport direction.

17. An apparatus according to claim 13, characterized in that the plurality of terminals is larger than the plurality of high resolution line cameras, wherein each terminal can be connected to each line camera.

18. An apparatus according to claim 13, characterized in that the plurality of terminals is smaller than or equal to the plurality of high resolution line cameras, wherein each terminal can be connected to each line camera.

19. An apparatus according to claim 13, characterized in that each terminal is provided with means for manual input of data.

20. An apparatus according to claim 13, characterized in that means are provided for producing a selective enlargement of a region of the surface of an article containing information.

21. An apparatus according to claim 13, characterized in that means are provided for automatic capture of information and for display of the automatically captured data.

22. An apparatus according to claim 13, characterized in that an element carrying a sensor of the line camera is rotatably mounted about an axis parallel to the axis or longitudinal extent of the sensor.

23. An apparatus according to claim 22, characterized in that a cam is provided which bears on the element carrying the sensor, by means of which the element can be rotated into different positions.

24. An apparatus according to claim 23, characterized in that a biasing spring acting against the cam bears on the element carrying the sensor.

25. An apparatus according to claim 13, characterized in that the network is a high speed network.

26. An apparatus according to claim 25, characterized in that the network is an ATM network or a 100 Mbit Ethernet, preferably with a switching hub.

27. An apparatus according to claim 13, characterized in that an illuminating means is provided for each line camera which comprises an approximately linear light source, the light from which is concentrated by a focusing means, wherein a plane of maximum luminous intensity is formed which is inclined to both the plane of the convey or and to the image plane of the line camera.

28. An apparatus according to claim 27, characterized in that the illuminating means or its focusing means and light source are arranged so that the plane of maximum luminous intensity cuts the image plane at about the level of the surface of the convey or somewhat above it.

29. An apparatus according to claim 28 characterized in that the angle between the image plane and the plane of maximum luminous intensity is at least 10° and at most 50°.

* * * * *